United States Patent Office 2,951,567
Patented Sept. 6, 1960

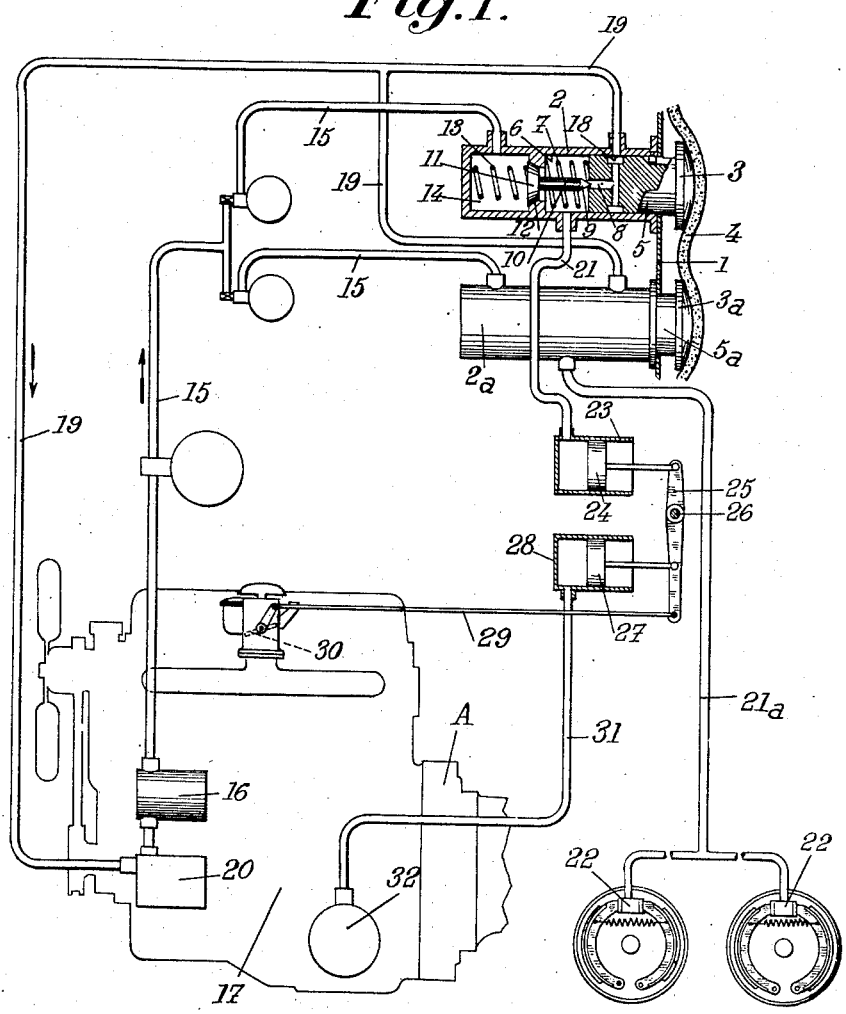

2,951,567

FOOT OPERABLE CONTROL DEVICE FOR AN AUTOMOBILE VEHICLE

Paul Panhard, Paris, France, assignor to Societe Anonyme des Anciens Etablissements Panhard & Levassor, Paris, France, a French society Filed Nov. 7, 1958, Ser. No. 772,608

Claims priority, application France Nov. 14, 1957

5 Claims. (Cl. 192—3)

The present invention relates to foot operable control devices for automobile vehicles and in particular for road vehicles driven by an internal combustion engine.

At the present time, on these vehicles, the control system generally includes a brake control, a throttle valve control and possibly a clutch control, each of these controls being obtained nearly always by a pedal the gradual action of which is determined exclusively by the more or less important displacement of the movable element thereof. The only exceptions to such arrangements are concerned with pedals having a small amplitude of displacement and used to control hydraulic brakes. Such pedals are subjected, during the braking action, to a thrust exerted in a direction opposed to the thrust imparted by the foot of the driver, this first mentioned thrust depending upon the value of the pressure brought into play to ensure braking.

According to the present invention, the control device of the throttle valve comprises, on the one hand, a pedal having a very small amplitude of displacement acting upon a hydraulic distributing valve capable of delivering a power pressure which is the higher as the pressure exerted on the pedal by the foot of the driver is higher, on the other hand a device capable of exerting an opposing action which is the higher as the speed of the engine of the vehicle is higher, and finally a part connected with the throttle valve and being movable under the combined effects of said power pressure and said opposing action.

A preferred embodiment of the present invention will be hereinafter described with reference to the accompanying drawing, given merely by way of example and in which:

Fig. 1 diagrammatically shows the whole of the throttle valve and brake controls of an automobile vehicle driven by an internal combustion engine which is coupled with the wheels of the vehicle by an automatic clutch device, these controls being made according to the present invention.

Fig. 2 diagrammatically shows the arrangement of the pedals with respect to the floor of the driver's cabin.

On Fig. 1, the internal combustion engine is partly shown in outline, together with the automatic clutch device which transmits power from said engine to the wheels of the vehicle.

On the floor of the vehicle, and advantageously, at right angles to an inclined portion 1 of said floor (but nearer to the driver's seat than in the case of conventional pedals having a long amplitude of displacement), are disposed two hydraulic distributing valves 2 and 2a each adapted to be operated by one of the feet of the driver pushing a pedal or button 3 (or 3a) which projects from floor 1 only to a minimum height necessary to permit the correct operation which is to be hereinafter described. As a matter of fact, the useful amplitude of displacement of pedals 3 and 3a is very small (averaging for instance one millimeter).

Thus, it becomes unnecessary for the driver to move his feet in order to operate the different controls for driving the vehicle. It is even possible to dispense with any visible pedal or button, buttons 3 and 3a being hidden under a rug 4 and operated through this rug by merely varying the pressure exerted by the driver's foot thereon.

Each hydraulic distributing valve will be such that, when it is operated, it applies on the corresponding button 3 (or 3a) a thrust opposed in direction to that of the thrust exerted by the driver's foot and which depends upon the pressure brought into play by the distributing device in the system to be controlled.

In the embodiment illustrated by the drawing (considering only, for instance, the distributing device for controlling the throttle valve 30, the other distributing device being identical), button 3 is in contact, or rigid, with a piston 5 slidable in a cylindrical body 6, this piston being urged rearwardly (that is to say against the driver's foot) by a spring 7. Piston 5 is provided with an axial blind hole or passage 8 the end of which opens into the front face of the piston. A double valve 10 is mounted in body 6 and it includes two valve elements, one, designated by reference numeral 9, which cooperates with the front end of passage 8 and the other, designated by reference numeral 11, which cooperates with a seat 12 provided in a partition dividing body 6 into two chambers one of which is designated by reference numeral 14. A spring 13 urges valve 10 in the rearward direction so as to apply valve element 11 against its seat, and thus to close chamber 14. Chamber 14 is fed through a conduit 15 with a liquid under pressure supplied, with the interposition of a hydraulic accumulator, by a pump 16 driven by the engine 17 of the vehicle. The rear end of passage 8 communicates with a port 18 provided in the side wall of piston 5 and said port 18 is positioned in such manner that, when piston 5 is in its rearward position, port 18 is located opposite the end of a discharge orifice 19 leading back to the feed tank 20 of pump 16. A conduit 21 connects the distributing valve with the system to be controlled.

Thus, in the state of rest, the pressure existing in chamber 14 keeps valve element 11 closed, whereas conduit 21 is connected, through passage 8, with discharge conduit 19. No pressure is transmitted to the system to be controlled.

On the contrary, if the driver depresses button 3, piston 5 is moved forwardly and the orifice of passage 8 is applied against valve element 9 and is stopped by it. Immediately after this, valve 11 moves away from seat 12 and fluid under pressure, coming from chamber 14, passes through conduit 21 toward the system to be controlled. As a consequence of this, the pressure transmitted to the front face of piston 5 exerts thereon a rearward thrust opposed to the action of the driver's foot on button 3 and which depends upon the pressure transmitted through conduit 21.

If the driver reduces the pressure exerted by him upon button 3, piston 5 moves rearwardly, which closes valves 11—12 and opens passage 8. The pressure then drops in conduit 21.

It will be understood that a very small displacement of button 3 is sufficient to ensure the operation above described.

Concerning the brake control, conduit 21a is connected directly with the braking cylinders 22, the pressure that exists therein being then directly transmitted to the driver's foot by the thrust exerted on piston 5a.

Concerning the throttle valve control, conduit 21 is connected with a cylinder 23 in which a piston 24 is slidable, said piston being operatively connected with one of the arms of a lever 25 pivotally mounted about a fixed axis 26. The other arm of said lever is connected on the one hand to a piston 27 sliding in a cylinder 28, and on the other hand to a link 29 serving to control the throttle valve 30 of the engine carburettor. Cylinder 28 is connected, through a conduit 31, to a pump 32 which gives at any time a pressure depending upon the speed of rotation of engine 17 so that piston 27 exerts upon lever 25 an action opposed to that exerted by piston 24 and which is the higher as the speed of the engine is itself higher.

Pump 32 may be the lubricating pump of engine 17 or the pump of a liquid cooling device of said engine.

But this pump might be replaced by any other source of pressure supplying a pressure which is the higher as the speed of rotation of the engine is higher.

It might for instance be constituted, either by a distributing valve fed with liquid under pressure from any suitable source and controlled for instance by a centrifugal governor in such manner that said governor determines a pressure which is the higher as the speed of rotation of the engine is higher, or by the portion of the intake manifold of the engine located downstream of the throttle valve, in which portion of the manifold there is a pressure (lower than atmospheric pressure) which, for a given opening of said throttle valve, is the lower as the engine is rotating at a higher speed. In this case, the piston 27 would be subjected to a suction tending to close the throttle valve.

Now the system being made as shown by Fig. 1, the pressure transmitted through conduit 21 and acting upon piston 24 tends to open throttle valve 30, whereas the pressure exerted upon piston 28 tends to close it. Therefore, when the driver is depressing button 3, the throttle valve opens until the respective actions of pistons 24 and 27 balance each other, the driver feeling under his foot the thrust due to the pressure then applied upon piston 5. If the pressure supplied by pump 32 becomes preponderating, the driver having for instance reduced the thrust exerted by him upon button 3, the throttle valve of the carburettor is moved in the closing direction.

It will be understood that the advantages of a vehicle provided with a control system as above described are for instance the following ones: the operation of the vehicle by the driver is easy; the space left to the driver is the same as in conventional vehicles but the driver's cabin is shorter by about 10 cm., in view of the fact that buttons 3 have an amplitude of displacement much shorter than that of the usual pedals; the inside of the vehicle is more liquid tight because it is no longer necessary to provide holes in the partition existing between the driver's space or cabin and the engine space; the appearance of the vehicle is improved in view of the fact that the pedals are no longer visible.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A control device for operating the throttle valve of an automobile vehicle internal combustion engine which comprises, in combination, a source of liquid under pressure, a hydraulic motor having a fixed part provided with a liquid inlet and a member movable with respect to said fixed part in one direction in response to the feed of liquid under pressure to said liquid inlet, means for operatively connecting said member with said throttle valve, said means being arranged so that said throttle valve is gradually opened in response to displacement of said member in said direction, means, responsive to variation of the speed of said engine, operatively connected with said throttle valve for yieldingly opposing the opening displacements thereof with a force the higher as the speed of said engine is higher, a hydraulic distributing device comprising a casing having an inlet connected with said source, a discharge outlet and an orifice, and valve means for placing said orifice in communication either with said last mentioned inlet or with said outlet, said valve means including a throttling portion for gradually opening the communication between said orifice and said last mentioned inlet when said orifice is placed in communication with said last mentioned inlet, said valve means including a piston part slidable in said casing and arranged to be subjected to the pressure of liquid having flown past said throttling part, said pressure acting in a direction opposed to the movement of said valve means in the direction tending to open said throttling part, a connection extending between said orifice and said hydraulic motor inlet, and a pedal operatively connected with said valve means to impart thereto a thrust in the last mentioned direction whereby said thrust is opposed by that exerted by said liquid and which is the higher as the liquid pressure in said hydraulic motor means is higher, said pedal having a very limited amplitude of displacement.

2. A control device according to claim 1 in which the means for yieldingly opposing the opening displacements of the throttle valve include a source of pressure giving at any time a pressure in relation to the speed of rotation of the engine.

3. A control device according to claim 1 in which the means for yieldingly opposing the opening displacements of the throttle valve include a pump driven in rotation at a speed varying in the same direction as the speed of the engine.

4. A control device according to claim 1 further including a braking system and a hydraulic distributing device interposed between said source of liquid under pressure and said braking system, said distributing device being similar to the distributing device recited in claim 1, and a pedal for operating said second mentioned distributing device.

5. A control device according to claim 4 further including a rug for covering both of said pedals.

References Cited in the file of this patent

UNITED STATES PATENTS

| | | |
|---|---|---|
| 2,055,539 | Jacoby et al. | Sept. 29, 1936 |
| 2,556,485 | Robnett | June 12, 1951 |
| 2,810,461 | Seay | Oct. 22, 1957 |

FOREIGN PATENTS

| | | |
|---|---|---|
| 872,013 | France | Jan. 29, 1941 |